US007629974B2

(12) United States Patent
Ohta

(10) Patent No.: US 7,629,974 B2
(45) Date of Patent: Dec. 8, 2009

(54) STORAGE MEDIUM STORAGE GAME IMAGE PROCESSING PROGRAM, GAME IMAGE PROCESSING APPARATUS AND GAME IMAGE PROCESSING METHOD

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 429 days.

(21) Appl. No.: 11/606,062

(22) Filed: Nov. 30, 2006

(65) Prior Publication Data

US 2007/0257940 A1 Nov. 8, 2007

(30) Foreign Application Priority Data

May 2, 2006 (JP) .............................. 2006-128217

(51) Int. Cl.
*G06T 15/00* (2006.01)
(52) U.S. Cl. ...................... 345/428; 345/611; 345/613
(58) Field of Classification Search ................ 345/428, 345/611, 613
See application file for complete search history.

(56) References Cited

U.S. PATENT DOCUMENTS

| 5,255,357 | A | * | 10/1993 | Byron et al. ................ 345/170 |
| 5,574,479 | A | | 11/1996 | Odell |
| 5,627,565 | A | | 5/1997 | Morishita et al. |
| 5,754,188 | A | * | 5/1998 | Seto et al. .................... 345/472 |
| 5,910,805 | A | * | 6/1999 | Hickey et al. ............... 345/467 |
| 6,282,327 | B1 | * | 8/2001 | Betrisey et al. ............. 382/299 |
| 6,377,262 | B1 | * | 4/2002 | Hitchcock et al. ........... 345/467 |
| 6,384,828 | B1 | * | 5/2002 | Arbeiter et al. .......... 345/472.2 |
| 6,982,697 | B2 | | 1/2006 | Wilson et al. |
| 7,006,109 | B2 | * | 2/2006 | Toji et al. .................... 345/613 |
| 7,139,983 | B2 | | 11/2006 | Kelts |
| 7,158,118 | B2 | | 1/2007 | Liberty |
| 7,262,760 | B2 | | 8/2007 | Liberty |
| 7,292,151 | B2 | | 11/2007 | Ferguson et al. |
| 7,408,555 | B2 | * | 8/2008 | Arnold et al. ............... 345/467 |
| 7,414,611 | B2 | | 8/2008 | Liberty |
| 7,440,037 | B2 | * | 10/2008 | Wang et al. ................. 348/607 |

FOREIGN PATENT DOCUMENTS

JP  2000-123162  4/2000

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner*—Phu K Nguyen
(74) *Attorney, Agent, or Firm*—Nixon & Vanderhye PC

(57) ABSTRACT

A video game apparatus functioning as a game image processing apparatus includes a CPU, and the CPU converts a resolution of a game image according to a game image processing program. A GPU draws an original game image on a frame buffer according to an instruction by the CPU. This is stored in a main memory as an original texture, and the original texture enlarged into double is drawn on the frame buffer. Next, when two texels adjacent to each other in a lower right direction and in an upper right direction have a same color, a semi-transparent texel in this color is drawn. Namely, a jaggy interpolation processing is applied.

5 Claims, 13 Drawing Sheets

(A) GAME IMAGE AFTER JAGGY INTERPOLATION PROCESSING IN LOWER RIGHT DIRECTION (B) GAME IMAGE AFTER JAGGY INTERPOLATION PROCESSING IN UPPER RIGHT DIRECTION

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

* cited by examiner (A) ORIGINAL GAME IMAGE (B) ORIGINAL TEXTURE IS ENLARGED INTO DOUBLE (A) JAGGY INTERPOLATION IN LOWER RIGHT DIRECTION (B) JAGGY INTERPOLATION IN LOWER RIGHT DIRECTION (A) JAGGY INTERPOLATION IN LOWER RIGHT DIRECTION (B) JAGGY INTERPOLATION IN UPPER RIGHT DIRECTION (A) PASTING BY TEXTURE COORDINATES AS THEY ARE $(u, v) = (0.0, 0.0)$ $(u, v) = (1.0, 1.0)$ (B) PASTING BY TEXTURE COORDINATES SHIFTED IN OBLIQUELY LOWER RIGHT DIRECTION $(u, v) = (1.0/SWX, 1.0/SWY)$

POLYGON $(u, v) = (1.0+1.0/SWX, 1.0+1.0/SWY)$ (A) GAME IMAGE AFTER JAGGY INTERPOLATION PROCESSING IN LOWER RIGHT DIRECTION (B) GAME IMAGE AFTER JAGGY INTERPOLATION PROCESSING IN UPPER RIGHT DIRECTION

COLOR EMPHASIZING

TARGET ORIGINAL PIXEL

GAME IMAGE AFTER COLOR EMPHASIZING PROCESSING (A) JAGGY INTERPOLATION IN LOWER RIGHT DIRECTION
WHEN RESOLUTION IS CONVERTED INTO TRIPLE (1)

TEXEL FOR INTERPOLATION (B) JAGGY INTERPOLATION IN LOWER RIGHT DIRECTION
WHEN RESOLUTION IS CONVERTED INTO TRIPLE (2)

TEXEL FOR INTERPOLATION

STORAGE MEDIUM STORAGE GAME IMAGE PROCESSING PROGRAM, GAME IMAGE PROCESSING APPARATUS AND GAME IMAGE PROCESSING METHOD

CROSS REFERENCE TO RELATED APPLICATION

The disclosure of Japanese Patent Application No. 2006-128217 is incorporated herein by reference.

TECHNICAL FIELD

The exemplary embodiments disclosed herein relate to a storage medium storing a game image processing program, a game image processing apparatus and a game image processing method. More specifically, the exemplary embodiments disclosed herein relate to a storage medium storing a game image processing program, a game image processing apparatus and a game image processing method that convert and output a resolution of a game image.

BACKGROUND AND SUMMARY

An example of a game image processing apparatus of the related art is disclosed in Japanese Patent Laying-open No. 2000-123162 laid-open on Apr. 18, 2000 [G06T 3/40, G06T 9/20, H04N 1/409] (Technical document). According to this technical document, when an interpolation method of increasing constituent pixels is performed to an image having a jaggy occurred therein, in order to prevent the jaggy from occurring as much as possible, an image data interpolation method as described below is disclosed. A pixel data interpolation method of the technical document comprises and sequentially executes an original image data acquisition step A1 of acquiring image data processed in the previous step as original image data of interpolation processing; an edge direction detecting step A2 of detecting an edge direction at each pixel based on the same image data; an edge smoothing step A3 of smoothing the edge portion along the edge direction; a pixel interpolation step A4 of executing an original interpolation processing after the smoothing; and an image data output step A5 of transferring each pixel data after interpolation to the next step. However, the original image is a multi-level image inputted from a scanner, a digital camera, and a video camera, and an outputted image is the image of high resolution inputted in a color printer, etc.

However, the image data interpolation method described in the technical document detects the edge by using a filter, and a feature of this method is to apply it to the image having many gradations, a large number of pixels in the edge portion, and high resolution. Accordingly, in this related art, when applied to the image such as a dot picture in a game image with a small number of pixels in a characteristic part wherein each one of the dots expresses the characteristic of the image, there is a problem that detection in the edge direction and smoothing of the edge can not be properly performed, and an excellent image can not be obtained.

Therefore, a feature of certain exemplary embodiments is to provide a novel storage medium storing a game image processing program, game image processing apparatus, and game image processing method.

It is another feature of certain exemplary embodiments to provide a storage medium storing a game image processing program, a game image processing apparatus and a game image processing method, capable of excellently reducing a jaggy of the image having relatively small size of a characteristic part, when a resolution of a game image is converted into a high resolution.

The certain exemplary embodiments described herein have adopt the following construction in order to solve the above-described problems. It should be noted that reference numerals and footnote, etc. which are enclosed in parentheses show only one example of correspondences with the embodiment described later in order to help the understandings of the certain exemplary embodiments described herein, and are not intended to be limiting.

The storage medium storing the game image processing program according to an exemplary embodiment stores the game image processing program executed by a computer of the game image processing apparatus that converts the resolution of the game image from a first resolution into a second resolution of n-times of the first resolution and outputs the game image after conversion. The game image processing program causes the computer to function as a resolution converting means, a comparing means, an interpolation means and an outputting means. The resolution converting means generates a high resolution image obtained by converting a low resolution image of the first resolution into the second resolution, and stores the image after conversion in the storage means. As to an arbitrary pixel in the low resolution image, the comparing means compares pixel values of the pixel and the pixel adjacent to the pixel in an oblique direction. The interpolation means shifts the pixel having the same pixel value obtained by a comparison by the comparing means, by m ($1 \leq m \leq n-1$) pixels in an oblique direction of the pixel of the high resolution image corresponding to the pixel at the second resolution, then superposing the pixel on the high resolution image in a semi-transparent state, thereby updating the high resolution image. The output means outputs the high resolution image thus updated by the interpolation means.

Specifically, the game image processing program is executed by computers (36 and 42) of the game image processing apparatus (12) for converting the game image of the first resolution into the game image of the second resolution that is n-times of the first resolution, and outputting the converted game image. The game image processing program allows the computer to function as resolution converting means (36, 42, S9, S11, S13), comparing means (36, 42, S17, S19), and interpolation means (36, 42, S17, S19), and output means (36, 42, 62, S5). The resolution converting means generates a high resolution image (200) obtained by converting a low resolution image (100) of the first resolution into the second resolution, and stores it in storage means (40, 404). As to an arbitrary pixel in the low resolution image, the comparing means compares pixel values of the arbitrary pixel and the pixel adjacent to the pixel in the oblique direction. The interpolation means shifts the pixel having the same pixel value (same color) obtained by the comparison by the comparing means, by m ($1 \leq m \leq n-1$) pixels in the oblique direction of the pixel of the high resolution image corresponding to the pixel at the second resolution, and superposing the pixel on the high resolution image in a semi-transparent state, thereby updating the high resolution image. For example, when the resolution is converted into double, the value of "m" is set as m=1, and the image including a semi-transparent pixel is shifted by one pixel and is superposed on the high resolution image. Also, for example, when the resolution is converted into triple, the value of "m" is set as m=1, 2, and the image including the semi-transparent pixel is shifted by one pixel or two pixels, and is superposed on the high resolution image.

Accordingly, the jaggy is reduced. The output means outputs the high resolution image updated by the interpolation means as a game screen.

According to certain exemplary embodiments, after the image is converted into the high resolution image, the pixel is interpolated between the pixels adjacent to each other in the oblique direction. Therefore, even in a case of the game image with a small number of pixels, the game screen can be easily viewed by reducing the jaggy. Namely, the resolution of the game image can be excellently converted.

According to a certain exemplary embodiment, the comparing means includes a first pixel value comparing means for comparing pixel values of an arbitrary pixel and the pixel adjacent to the arbitrary pixel in the lower right direction, and a second pixel value comparing means for comparing the pixel values of the arbitrary pixel and the pixel adjacent to the arbitrary pixel in the upper right direction. The interpolation means includes a first pixel interpolation means for shifting the pixel having the same pixel value obtained by the comparison by the first pixel value comparing means, by m-pixels in the lower right direction of the pixel of the high resolution image corresponding to the pixel at the second resolution, then superposing the pixel on the high resolution image in a semi-transparent state, thereby updating the high resolution image, and a second pixel interpolation means for shifting the pixel having the same pixel value obtained by the comparison by the second pixel value comparing means, by m-pixels in the upper right direction of the pixel of the high resolution image corresponding to the pixel at the second resolution, then superposing the pixel on the high resolution image in a semi-transparent state, thereby updating the high resolution image. Specifically, first pixel comparing means (36, 42, S17) compare the pixel values of the arbitrary pixel and the pixel adjacent to the arbitrary pixel in the lower right direction. Second pixel comparing means (36, 42, S19) compares the pixel values of the arbitrary pixel and the pixel adjacent to the arbitrary pixel in the upper right direction. The first pixel interpolation means (36, 42, S17) shifts the pixel having the same pixel value obtained by the comparison by the first pixel value comparing means, by m-pixels in the lower right direction of the pixel of the high resolution image corresponding to the pixel at the second resolution, then superposing the pixel on the high resolution image in a semi-transparent state, thereby updating the high resolution image. Namely, a jaggy interpolation processing in the lower right direction is applied. Also, in the same way, the second pixel interpolation means (36, 42, S19) shifts the pixel having the same pixel value obtained by the comparison by the second pixel value comparing means, by m-pixels in the upper right direction of the pixel of the high resolution corresponding to the pixel by the second resolution, then superposing the pixel on the high resolution image in a semi-transparent state, thereby updating the high resolution image. Namely, the jaggy interpolation processing in the upper right direction is applied. In the way, the jaggy in the lower right direction and in the upper right direction can be reduced. Namely, the jaggy over an entire body of the game image can be reduced.

According to a certain exemplary embodiment, as to the arbitrary pixel of the lower resolution image, the game image processing program causes the computer to further function as a third pixel value comparing means for comparing the pixel values of the pixels adjacent to each other in the upper and lower directions and the pixel values of the pixels adjacent to each other in the right and left directions, respectively, and a third pixel value interpolation means for superposing a pixel having the same pixel value in at least one of the upper and lower directions and the right and left directions, obtained by the comparison by the third pixel value comparing means, on the high resolution image corresponding to the pixel at the second resolution in a semi-transparent state, thereby updating the high resolution image. Specifically, as to the arbitrary pixel of the low resolution image, third pixel value comparing means (36, 42, S23) compare the pixel values of the pixel adjacent to each other in the upper and lower directions and the pixel adjacent to each other in the right and left directions, respectively. Third pixel value interpolation means (36, 42, S23) superpose at least one of the pixels in the upper and lower directions or right and left directions having the same pixel value, on the high resolution image of the second image corresponding to the pixel, in a semi-transparent state, thereby updating the high resolution image. For example when at least one of the pixels in the upper and lower directions or right and left directions have the same pixel value, opacity is set at 50%, and when both of the upper and lower pixels, and right and left pixels have the same pixel values, the opacity is set at 100%, and when both of the upper and lower pixels, and right and left pixels do not have the same pixel values, the opacity is set at 0%. However, when both of the upper and lower, and right and left pixels do not have the same pixel values, no pixels are drawn. This contributes to preventing a situation that a characteristic part expressed by one dot or one line is blurred and hardly viewed. Namely, color is emphasized, thereby making it possible to easily view.

The game image processing apparatus according to an exemplary embodiment converts the game image of the first resolution into the game image of the second resolution that is n-times of the first resolution and outputs the converted game image. The game image processing apparatus has a converting means, a storage means, a comparing means, an interpolation means, and an output means. The resolution converting means generates the high resolution image obtained by converting the low resolution image of the first resolution into the high resolution image of the second resolution, and stores it in the storage means. The storage means stores the high resolution image. As to the arbitrary pixel in the low resolution image, the comparing means compares the pixel values of the arbitrary pixel and the pixel adjacent to the arbitrary pixel in the oblique direction. The interpolation means shifts the pixel having the same pixel value obtained by the comparison by the comparing means, by m ($1 \leq m \leq n-1$) pixels in the oblique direction of the pixel of the high resolution image corresponding to the pixel at the second resolution, and superposes it on the high resolution image in a semi-transparent state, thereby updating the high resolution image. The output means outputs the high resolution image updated by the interpolation means.

According to the game image processing apparatus of certain exemplary embodiments also, in the same way as the storage medium of these certain exemplary embodiments, even in a case of the game image with a small number of pixels, the game screen can be made easy to be viewed by performing jaggy interpolation.

A game image processing method according to certain exemplary embodiments provides the game image processing method of the game image processing apparatus for converting the game image of the first resolution into game image of the second resolution that is n-times of the first resolution and outputting the converted game image, comprising the steps of: (a) generating the high resolution image obtained by converting the low resolution image of the first resolution into the second resolution, (b) as to the arbitrary pixel in the low resolution image, comparing the pixel values of the arbitrary pixel and the pixel adjacent to the arbitrary pixel in the oblique direction, (c) shifting the pixel having the same pixel value obtained by the comparison in the step (b), by m ($1 \leq m \leq n-1$) pixels along the oblique direction of the pixel of the high resolution image corresponding to the pixel at the second resolution, and superposing the pixel on the high resolution image in a semi-transparent state, thereby updating the high resolution image, and (d) outputting the high resolution image updated in the step (c).

According to the game image processing method described above also, in the same way as the storage medium of certain exemplary embodiments, even in the case of the game image with small numbers of pixels, the jaggy interpolation is performed, and the game screen can be made easy to be viewed.

The above described objects and other objects, features, aspects and advantages of the certain exemplary embodiments described herein will become more apparent from the following detailed description of these certain exemplary embodiments when taken in conjunction with the accompanying drawings.

DETAILED DESCRIPTION

Figure 1:
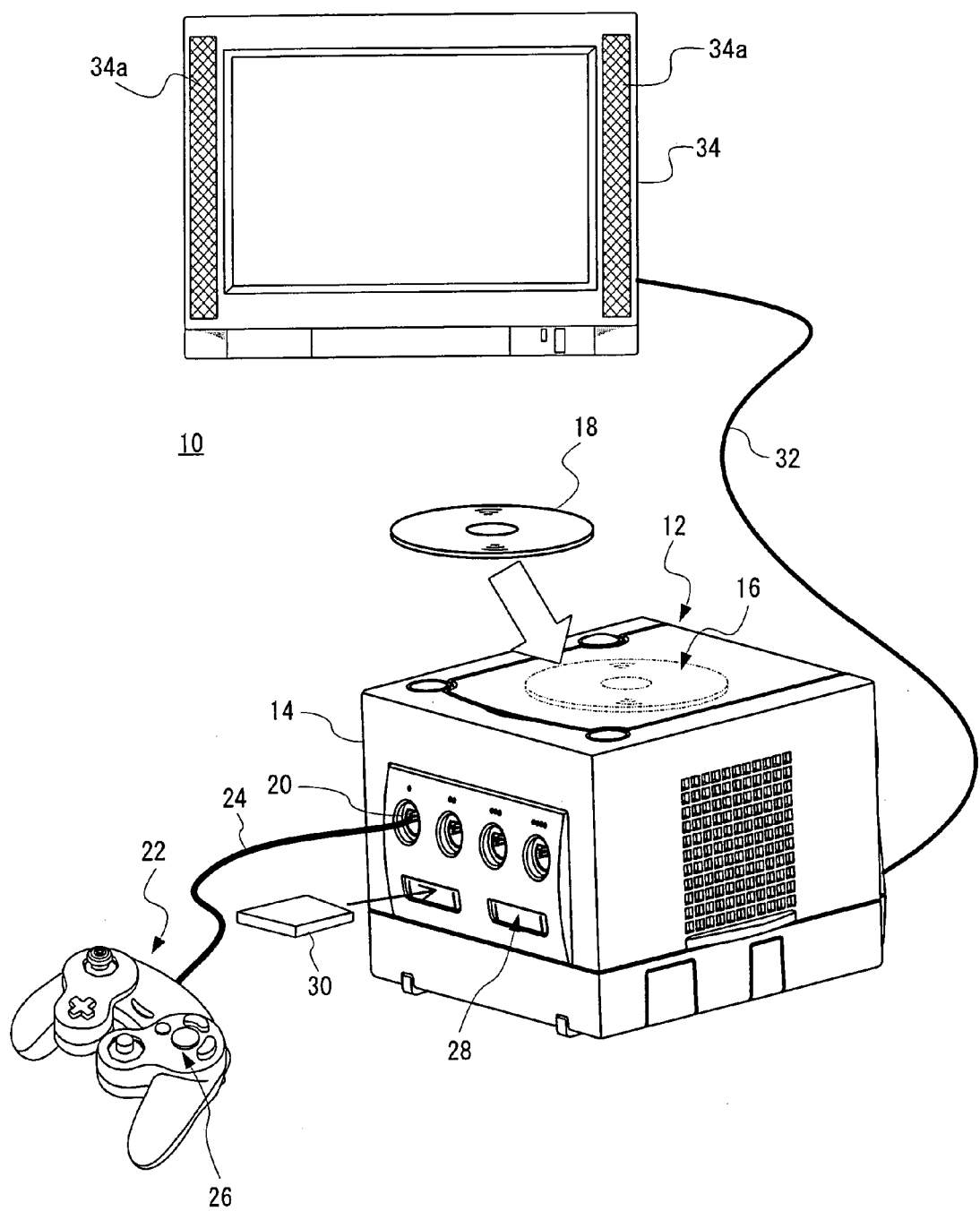
FIG. 1 is an illustrative view showing a game system of an exemplary embodiment.

Referring to FIG. 1, a description will be given as to a video game system 10 which comprises a video game apparatus 12 equipped with a three-dimensional image generating apparatus and a three-dimensional image generating program of a certain exemplary embodiment. The video game apparatus 12 includes an approximately cubic housing 14, and an optical disk drive 16 is provided on an upper end of the housing 14. Attached to the optical disk drive 16 is an optical disk 18 as an example of information storage medium storing a game program, etc. Provided on a front surface of the housing 14 is a plurality (four in this embodiment) of connectors 20. These connectors 20 are intended to connect a controller 22 to the video game apparatus 12 through a cable 24. In this exemplary embodiment, a maximum of four controllers 22 can be connected to the video game apparatus 12.

The controller 22 is provided with an operating part (operating switch) 26 on top surface, bottom surface, or side surface thereof. The operating part 26 includes two analog joysticks, one cross key, a plurality of button switches, etc. One analog joystick is used to input a moving direction and/or moving speed or moving amount of a player object (a moving image object capable of being operated by a player with the controller 22) by a tilted amount and direction of the stick. The other analog joystick controls the movement of a virtual camera according to its tilted direction. The cross switch is used to specify the movement of the player object as a substitute for the analog joystick. The button switch is utilized to specify a motion of the player object, switch the viewpoint of a virtual camera as a three-dimensional image, adjust the moving speed of the player object, etc. The button switch further controls selection of menu options and movement of a pointer or cursor, for example.

Besides, in this embodiment, the controller 22 is connected to the video game apparatus 12 through the cable 24 provided integrally therewith. However, the controller 22 may also be connected to the video game apparatus 12 in another way, for example, in a wireless manner via an electromagnetic wave (radio wave or infrared ray, for example). Also, a specific structure of the operating part 26 of the controller 22 is not limited to the structure of this embodiment but may be arbitrarily changed. For instance, only one analog joystick may be enough or no analog joysticks may be used at all. The cross switch does not always need to be employed.

One or a plurality (two in this embodiment) of memory slots 28 are provided on the front surface of the housing 14 and below the connector 20. A memory card 30 is inserted into the memory slot 28. The memory card 30 is used to load and store temporarily a game program, etc. read out from the optical disk 18 and save game data (result data or progress data of a game) of a game played on the game system 10.

An AV cable connector (not illustrated) is provided on a rear surface of the housing 14 of the video game apparatus. The connector is used to connect a monitor 34 to the video game apparatus 12 through the AV cable 32. The monitor 34 is typically a color television receiver. The AV cable 32 inputs a video signal from the video game apparatus 12 to a video input terminal of a color TV and inputs a sound signal to a sound input terminal. Accordingly, a game image of a three-dimensional (3D) video game is displayed on a screen of the color TV (monitor) 34, and stereo game sounds such as game music and sound effects are output from speakers 34a on both sides.

In the game system 10, for a user or a game player to play a game (or another application), the user firstly turns on the video game apparatus 12, next selects an appropriate optical disk 18 in which the video game (or another application to be played) is stored, and then loads the optical disk 18 into the disk drive 16 of the video game apparatus 12. Accordingly, the video game apparatus 12 starts executing the video game or another application based on software stored in the optical disk 18. The user operates the controller 22 to provide input to the video game apparatus 12. For example, the game or another application is started by manipulating some section of the operating part 26. By manipulating another section of the operating part 26, it is possible to move a moving image object (player object) in a different direction or change the viewpoint of the user (camera position) in a game world.

Figure 2:
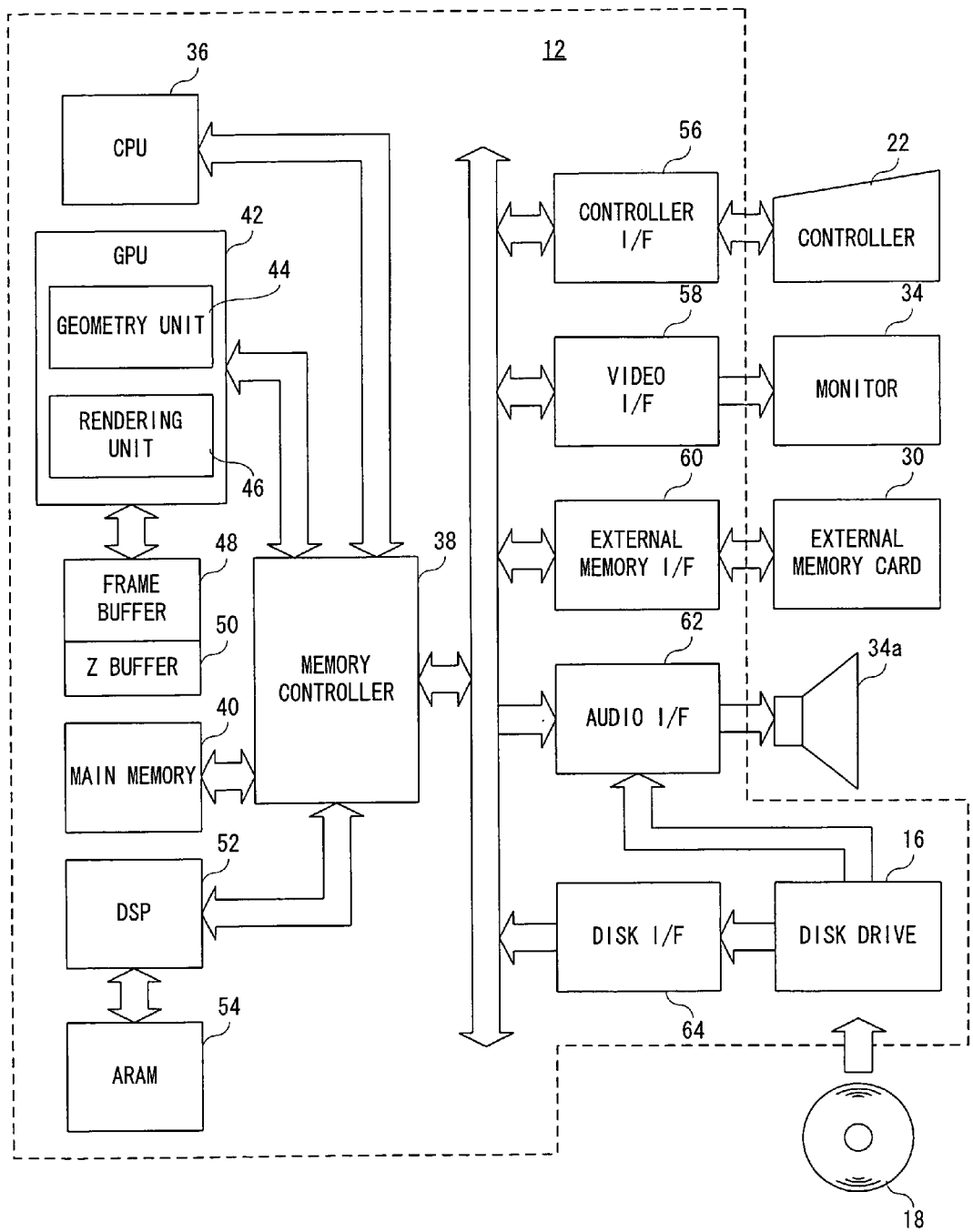
FIG. 2 is a block diagram showing an electrical constitution of the game system shown in FIG. 1.

FIG. 2 is a block diagram showing an electrical structure of the video game system 10 of FIG. 1 embodiment. The video game apparatus 12 is provided with a central processing unit (hereinafter referred to as "CPU") 36. The CPU 36 is also called computer or processor, and responsible for entirely controlling the video game apparatus 12. The CPU 36 or computer functions as a game processor and is connected with a memory controller 38 via a bus. The memory controller 38 mainly controls writing to and reading from a main memory 40 connected via the bus, under control of the CPU 36. The memory controller 38 is connected with a GPU (Graphics Processing Unit) 42.

The GPU 42 constitutes a part of a rendering means and consists of a single-chip ASIC, for example. It receives a graphics command (rendering order) from the CPU 36 via the memory controller 38, and generates a three-dimensional (3D) game image according to the command by using a geometry unit 44 and a rendering unit 46. More specifically, the geometry unit 44 carries out coordinate operation processes such as rotation, movement and transformation of various objects and objects in a three-dimensional coordinate system (formed of a plurality of polygons, and the polygon refers to a polygonal plane defined by at least three vertexes coordinates.) The rendering unit 46 subjects each polygon of various objects to image generating processes such as pasting a texture. Accordingly, 3D image data to be displayed on the game screen is generated by the GPU 42 and stored in a frame buffer 48.

Incidentally, the GPU 42 obtains data (primitives or polygons, textures etc.) required for the GPU 42 to execute the rendering command, from the main memory 40 via the memory controller 38.

The frame buffer 48 is a memory for rendering (accumulating) one frame of image data in a raster scan monitor 34, for example, and is updated by the GPU 42 on a frame-by-frame basis. More specifically, the frame buffer 48 stores color information of an image in orderly sequence on a pixel-by-pixel basis. The color information here is data of R, G, B and A, and for example, 8-bit R (red) data, 8-bit G (green) data, 8-bit B (blue) data and 8-bit A (alpha) data. Also, the A data is data on mask (mat image). A video I/F 58 described later reads out the data from the frame buffer 48 via the memory controller 38, thereby displaying a 3D game image on the screen of the monitor 34.

In addition, a Z buffer 50 has a capacity equivalent to the number of pixels corresponding to the frame buffer 48× the number of bits of depth data per pixel, and stores depth information or depth data (Z value) of a dot corresponding to each storage position in the frame buffer 48.

Besides, both the frame buffer 48 and the Z buffer 50 may be formed with use of one part of the main memory 40, and also may be provided within the GPU 42.

The memory controller 38 is also connected to RAM (referred to as "ARAM" hereafter) 54 for audio, via a DSP (Digital Signal Processor) 52. Thus, the memory controller 38 controls not only the main memory 40 but also writing to and/or reading from the ARAM 54 as a sub-memory.

The DSP 52 functions as a sound processor and generates audio data corresponding to sounds, voice or music required for the game by using sound data (not illustrated) stored in the main memory 40 or audio waveform data (not illustrated) written into the ARAM 54.

The memory controller 38 is further connected via the bus to interfaces (I/F) 56, 58, 60, 62 and 64. The controller I/F 56 is an interface for the controller 22, and provides an operating signal or data from the operating part 26 of the controller 22 to the CPU 36 through the memory controller 38. The video I/F 58 accesses the frame buffer 48 to read out the image data generated by the GPU 42 and provides an image signal or image data (digital RGBA pixel values) to the monitor 34 via the AV cable 32 (FIG. 1).

The external memory I/F 60 links a memory card 30 (FIG. 1) inserted into the front surface of the video game apparatus 12, with the memory controller 38. This allows the CPU 36 to write data into the memory card 30 or read out data from the memory card 30 via the memory controller 38. The audio I/F 62 receives audio data provided by the DSP 52 via the memory controller 38 or an audio stream read out from the optical disk 18, and provides the speaker 34a of the monitor 34 with an audio signal (sound signal) corresponding to it.

Furthermore, the disk I/F 64 connects the disk drive 16 to the memory controller 38, which causes the CPU 36 to control the disk drive 16. Program data, texture data and the like read out by the disk drive 16 from the optical disk 18 are written into the main memory 40 under control of the CPU 36.

Figure 3:
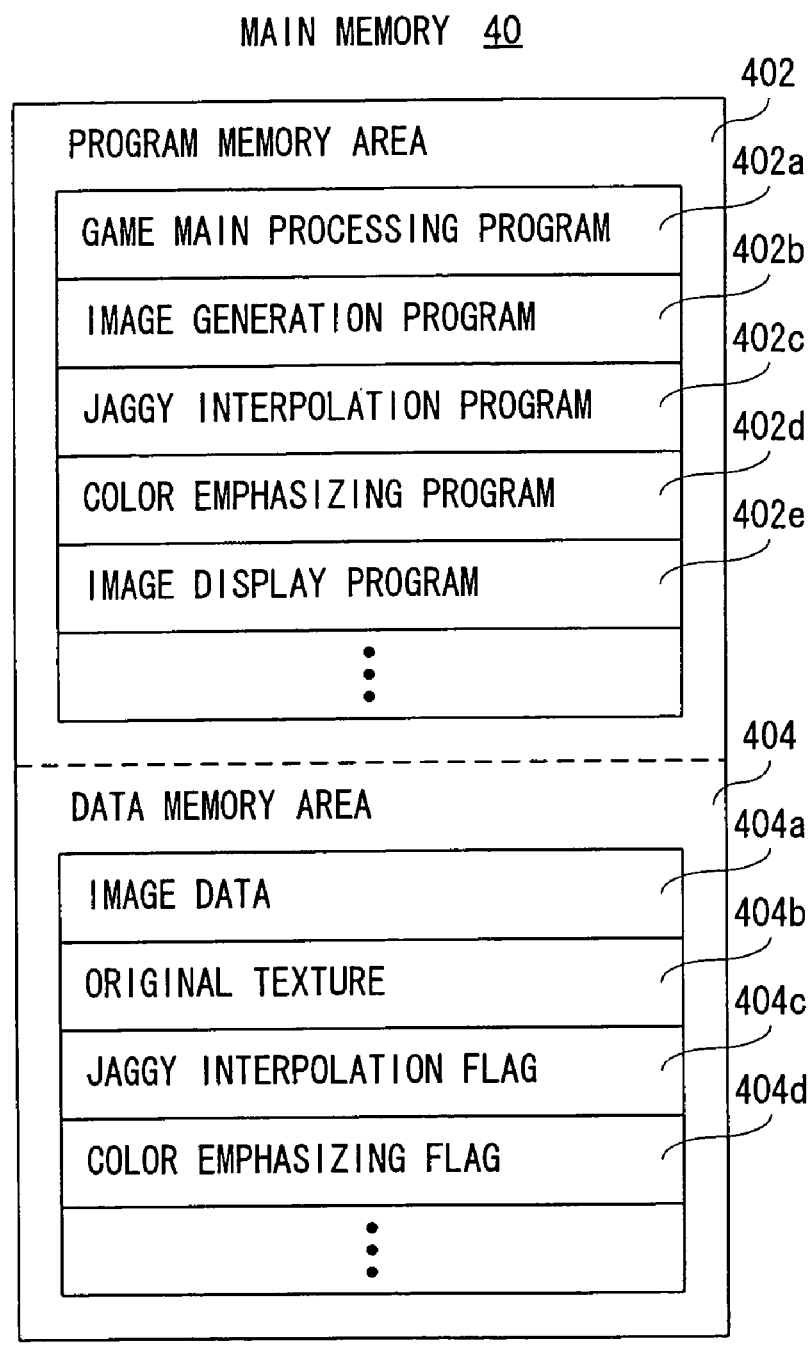
FIG. 3 is an illustrative view showing a memory map of a main memory shown in FIG. 2.

FIG. 3 shows an example of a memory map of a main memory 40 shown in FIG. 2. According to FIG. 3, the main memory 40 includes a program memory area 402 and a data memory area 404. The program memory area 402 stores a game program, and this game program is composed of a game main processing program 402a, an image generation program 402b, a jaggy interpolation program 402c, a color emphasizing program 402d, and an image display program 402e, etc. Note that a game image processing program is composed of the image generation program 402b, the jaggy interpolation program 402c, and the color emphasizing program 402d, etc.

The game main processing program 402a is a program for processing a main routine of a virtual game of this embodiment. The image generation program 402b is a program for generating the game image including a moving image object such as a player object and an enemy object that appear in the virtual game, and an item object or a background object, etc, by using image data 404a as will be described later.

When the resolution of the game image is converted into a prescribed times resolution such as double, the jaggy interpolation program 402c is a program for converting into double the resolution of the pixel of a part where the pixel values (color in this embodiment) of the arbitrary pixel of the original image (original game image) and the pixel adjacent to this arbitrary pixel in the oblique direction is coincident to each other (namely one pixel is converted into four pixels), then superposing this pixel (four pixels) on the high resolution image drawn on the frame buffer 48 corresponding to the pixel after conversion (four pixels) in a semi-transparent state in such a way that the pixel after conversion is shifted from the pixel of the high resolution image. Note that in the explanation given hereunder, conversion of the low resolution image into the high resolution image is referred to as an enlargement of the image. Specific jaggy interpolation baggy interpolation in the lower right direction and the jaggy interpolation in the upper right direction) processing will be explained in detail later.

In addition, according to this embodiment, an example of converting the resolution into double is explained. However, according to certain exemplary embodiments, a prescribed-times resolution may be converted, and the certain exemplary embodiments described herein can be applied to even a case that the resolution is converted into double or more.

When the resolution of the game image is converted into double, the color emphasizing program 402d is a program for comparing whether or not the color of the upper and lower, and right and left adjacent pixels of each pixel of the original game image have the same color, converting the resolution of the pixels having the same color into double, and drawing these pixels on the corresponding pixels of the high resolution image in such a manner as being shifted from each other and in the semi-transparent state. Specific color emphasizing processing will be explained later.

The image display program 402e is a program for displaying on the monitor 34, such as an original game image generated according to the image generation program 402b, or a screen that has undergone the jaggy interpolation and color emphasizing processing by enlarging the game image into double, or a screen that has undergone only the jaggy interpolation by enlarging the game image into double.

Note that although not shown, the program memory area 402 stores an audio output program and a backup program, and so forth. The audio output program is a program for outputting a sound required for the game such as a BGM, voice or imitative sound of the player object, and a sound effect. Also, the backup program is a program for saving the game data (intermediate data and result data of the game) in the memory card 30.

The data memory area 404 stores image data 404a, an original texture 404b, a jaggy interpolation flag 404c, and a color emphasizing flag 404d, and so forth.

The image data 404a is data for generating the game image (such as polygon and texture). The original texture 404b means that the original game image is set as a texture, when the resolution of the game image is converted into double, namely, when the low resolution image is converted into the high resolution image.

The jaggy interpolation flag 404c is a flag for determining whether or not the jaggy interpolation processing is applied. For example, the jaggy interpolation flag 404c is constituted of a register of one bit, and when this flag is on (established), data value "1" is set on the register, and when this flag is off (not-established), the data value "0" is set on the register. However, the jaggy interpolation flag 404c is on when the jaggy interpolation processing is applied, and is off when the jaggy interpolation processing is not applied.

The color emphasizing flag 404d is a flag for determining whether or not the color emphasizing processing is applied. This color emphasizing flag 404d is also constituted of the register of one bit, and when this flag is on, the data value "1" is set on the register, and when this flag is off, the data value "0" is set on the register. However, the color emphasizing flag 404d is on when the color emphasizing processing is applied, and is off when the color emphasizing processing is not applied. Also, in this embodiment, the color emphasizing processing is executed only when the jaggy interpolation processing is applied. Therefore, when the jaggy interpolation flag 404c is off the color emphasizing flag 404d is also off accordingly.

Note that although a detailed explanation is omitted, the player can set as needed whether or not the jaggy interpolation processing and the color emphasizing processing are executed, or whether or not only the jaggy interpolation processing is executed. Accordingly, in accordance with the setting by the player, the jaggy interpolation flag 404c and the color emphasizing flag 404d are on/off.

In addition, although not illustrated, the data memory area 404 stores game data and sound data, or other flag.

In the system 10 (video game apparatus 12) having the above-described constitution, game software for a conventional game machine can be executed as it is by an emulator, or can be played by re-made software in that a story, etc is partially reformed. In the conventional game machine such as a family computer (registered trademark), a super famicom (registered trademark), and a game boy (registered trademark), the performance of hardware such as a CPU and GPU is low. Therefore, in the game software for the game machines, the object is drawn by a dot picture of lower resolution (fewer numbers of pixels) than the number of scanning lines of a television, for example. Also, conventionally, since a television screen is also small, even the image of low resolution has a good appearance.

Meanwhile, in recent years, a television size has been increasing, and rich hardware such as CPU and GPU are loaded on the game apparatus of recent years such as the video game apparatus 12. Therefore, an inconvenience such as generating a delay in game processing does not occur, even when drawing the object of sufficiently high resolution corresponding to the number of scanning lines of the television.

When the conventional game software is processed by such a game machine of recent years, if the original game image of the conventional game software is simply enlarged and displayed with high resolution, a conventional low resolution state is enlarged as it is and is displayed on the monitor 34, because of small numbers of pixels of the original game image. Therefore, the jaggy is generated, involving a problem that an appearance is not good.

In order to solve such a problem, in this embodiment, when the game image of the low resolution is converted into the game image of the high resolution, by applying the jaggy interpolation processing and color emphasizing processing suitable for the conventional game image, a quality of the conventional game image is improved.

An outline of the processing of this embodiment will be explained as follows. First, the game image of the low resolution image is converted into the high resolution image, and the image after conversion is fetched into the frame buffer 48 (see FIG. 6). Then, each pixel in the low resolution image is compared with the pixel adjacent to this pixel in the oblique direction. The pixel having the same pixel value obtained by the comparison, is shifted in the oblique direction at the second resolution and superposed on the image in a semi-transparent state (see FIG. 7).

Figure 4:
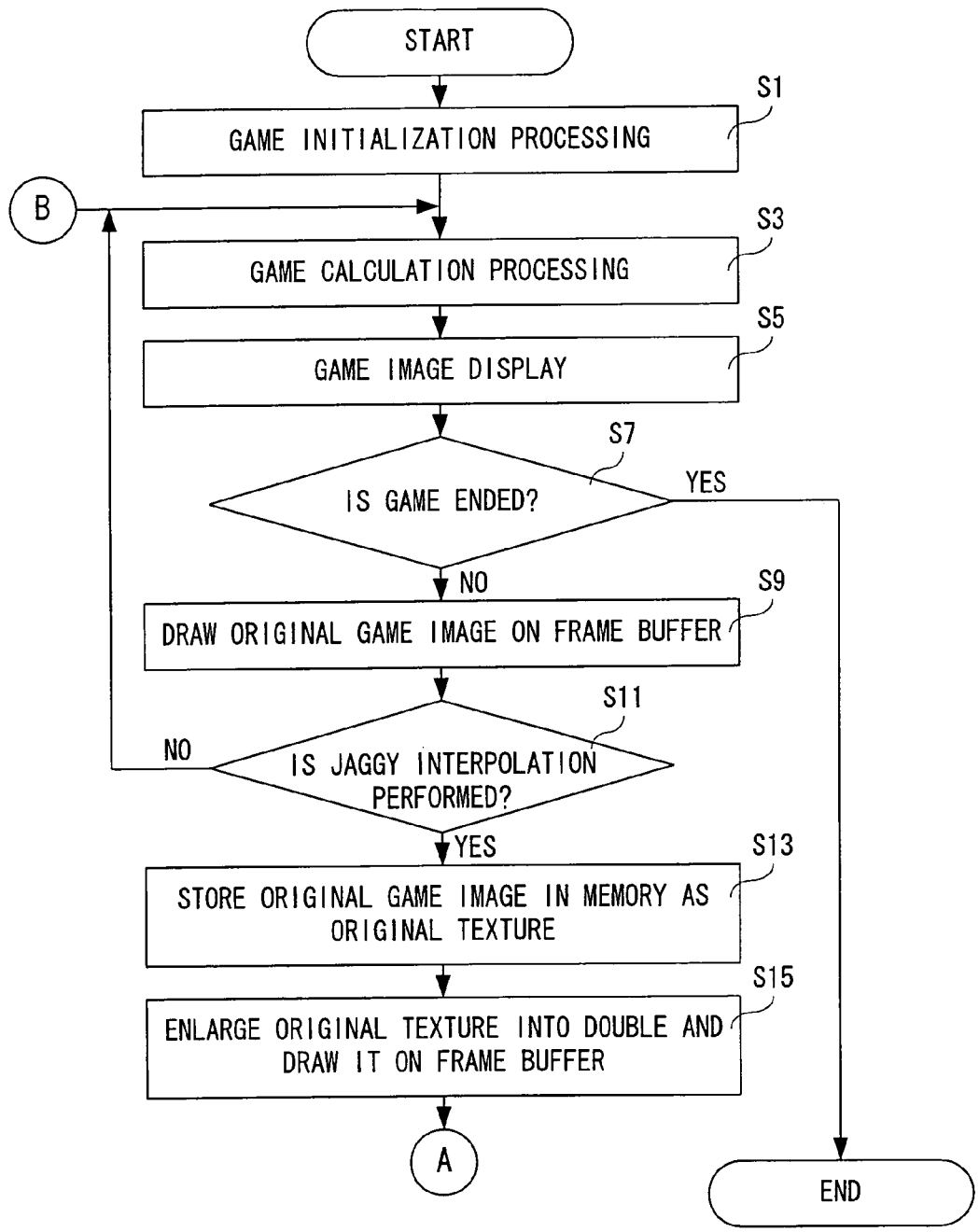
FIG. 4 is a flowchart showing one part of a game entire processing of a CPU shown in FIG. 2.
Figure 5:
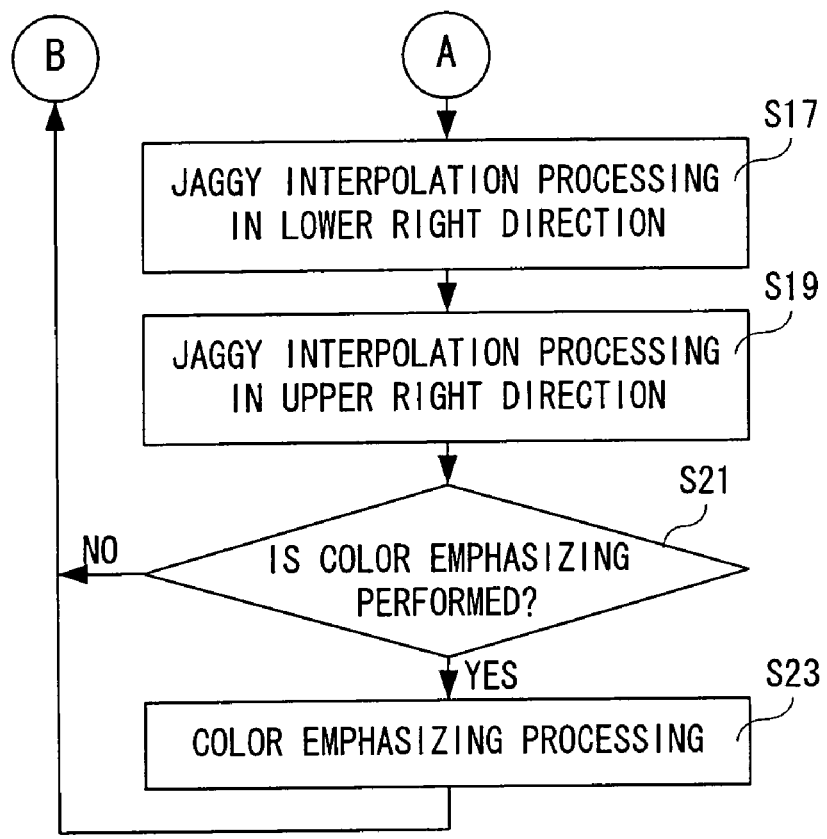
FIG. 5 is a flowchart showing another part of the game entire processing of the CPU shown in FIG. 2, following after FIG. 4.

Specifically, the game entire processing as shown in FIG. 4 and FIG. 5 is executed by computer (explained simply as "CPU 36" in the explanation given hereunder) realized in cooperative operations of a CPU 36 and a GPU 42, etc. As shown in FIG. 4, when the game entire processing is started, the CPU 36 executes game initialization processing in a step S1. Here, when the virtual game is started from the first, a buffer area of the main memory 40, a frame buffer 48, and a Z buffer 50 are cleared, and each flag (404c, 404d) is initialized. For example, the jaggy interpolation flag 404c and color emphasizing flag 404d are on/off in accordance with the setting by the player.

In a subsequent step S3, a game calculation processing is executed. For example, the CPU 36 updates a three-dimensional position of the player object in accordance with an operation input by the player, and updates the three-dimensional position of the enemy object. In addition, the CPU 36 switches a virtual camera (viewpoint) as needed. In a next step S5, the game image stored in the frame buffer 48 is outputted, and the game screen is displayed on the monitor 34, or the game screen displayed on the monitor 34 is updated.

Figure 6:
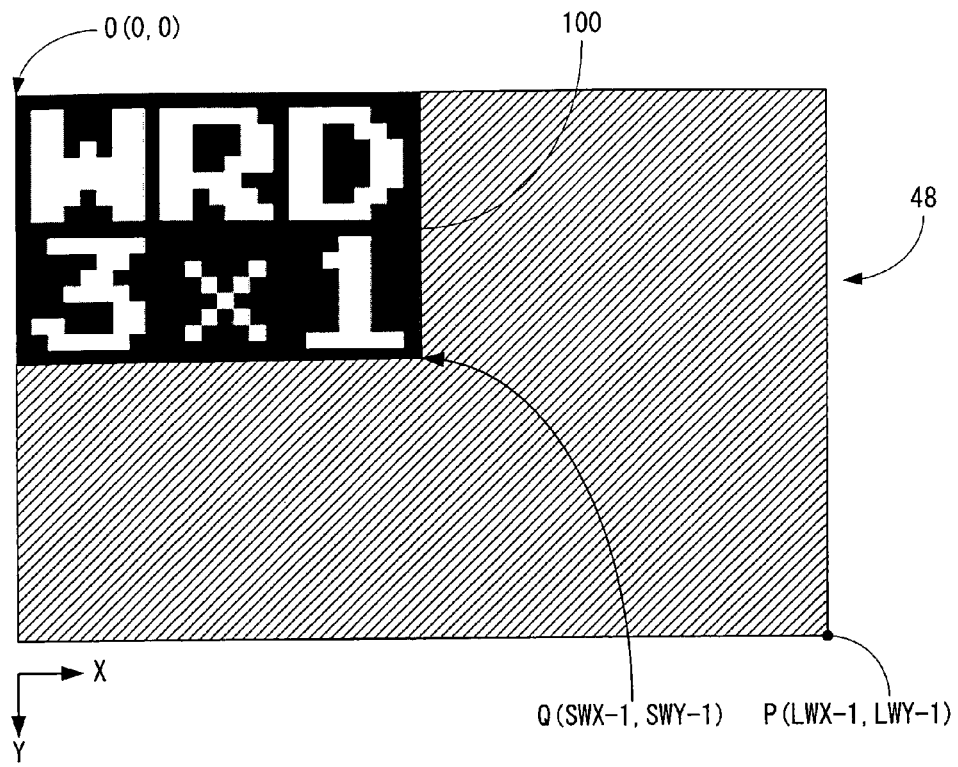
FIG. 6 is an illustrative view showing an original game image and an enlarged game image when a resolution of a game image is converted into double resolution.
Figure 6:
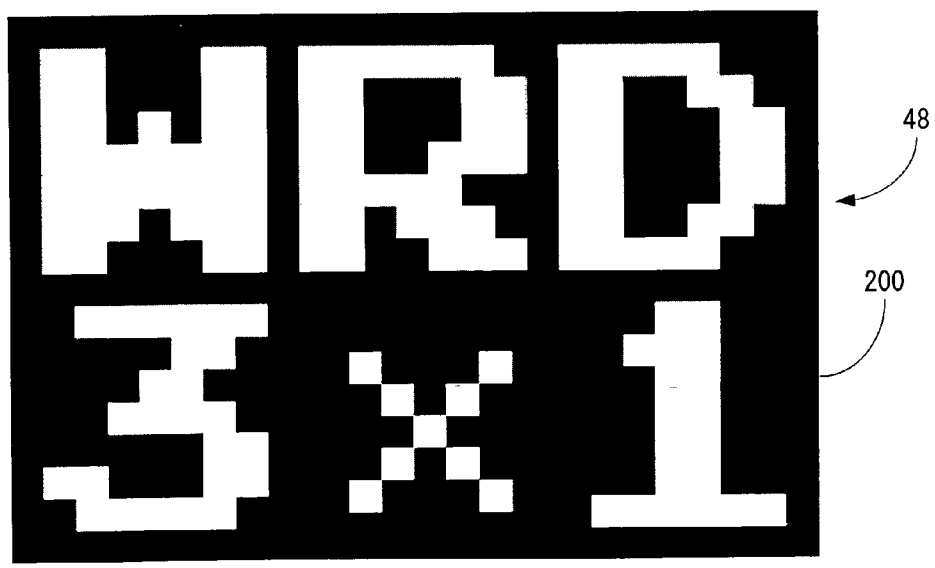

Then, in a step S7, it is determined whether or not the game is to be ended. Here, the player indicates the end of the game, and determines whether or not the game is over. If "YES" in the step S7, namely, when the game is ended, the game entire processing is completed as it is. Meanwhile, if "NO" in the step S7, namely, when the game is not ended, the original game image is drawn on the frame buffer 48 in a step S9, and the processing is advanced to a step S11. Namely, an original game image 100 is generated in the step S9. Specifically, as shown in FIG. 6 (A), the original game image 100 is drawn on the frame buffer 48.

Here, the frame buffer 48 has a size of longitudinal (LWY)×lateral (LWX). However, the LWX and LWY are numerical values, and a unit thereof is a dot. Accordingly, when an upper left apex is set as an original point O (0, 0), the frame buffer 48 can store the image in a range from the original point O to a right lower apex P (LWX−1, LWY−1). However, the right direction of the figure is the X-axis positive direction, and lower direction of the figure is the Y-axis positive direction. The same thing can be said hereunder. Also, as is clarified from FIG. 6 (A), the original game image 100 is stored in a range from the original point O to point Q (SWX−1, SWY−1).

However, in this embodiment, the size of the frame buffer 48 (LWX×LWY) is 2×2 times of the size (SWX×SWY) of the original game image 100. Namely, the relation is represented by Equation 1.

$$LWX = SWX \times 2$$

$$LWY = SWY \times 2 \qquad \text{[Equation 1]}$$

Returning to FIG. 4, and in the step S11, it is determined whether or not the jaggy interpolation is performed. Specifically, the CPU 36 determines whether or not the jaggy interpolation flag 404c is on. If "NO" in the step S11, namely, when the original game image 100 is displayed without jaggy interpolation, the processing is returned to the step S3 as it is. Meanwhile, if "YES" in the step S11, namely, when the original game image 100 is displayed by applying jaggy interpolation when the resolution thereof is enlarged into double, in a step S13, the original game image 100 drawn on the frame buffer 48 is stored (temporarily stored) in the main memory 40 as an original texture 404b. In the same way as the game image 100, the image size of the original texture 404b is SWX×SWY, and texture coordinates (u, v) is generally defined in a range of 0.0 to 1.0 as the position in the image.

Subsequently, in a step S15, by using the original texture 404b, the original game image 100 is drawn by pasting it so as to be a double size (called "enlarged game image 200"), the enlarged game image 200 is stored in the frame buffer 48, and the processing is advanced to a step S17 as shown in FIG. 5. As shown in FIG. 6 (B), the enlarged game image 200 is drawn between the original point (0, 0) and the apex P (LWX−1, LWY−1).

Note that the original game image 100 is the low resolution image and is drawn by small numbers of dots. Therefore, as is clarified from FIG. 6 (B), when the original game image 100 is simply enlarged, jaggy appears remarkably. Namely, when the simply enlarged original game image 100 is displayed as the game screen, the appearance is not good.

Next, in the step S17, the jaggy interpolation processing in the lower right direction is performed. Here, the original texture is enlarged into double and drawn in a range from the frame buffer coordinates (1, 1) to (LWX, LWY) in a state of two-layered structure by using the texture coordinates as they are and the texture coordinates shifted so as to gather the texels in an obliquely lower right direction. Specifically, in the original texture, the texture coordinates corresponding to the area of (0, 0) to (SWX−1, SWY−1) and the texture coordinates corresponding to the area of (1, 1) to (SWX, SWY) are designated, and the original texture is drawn so that these areas are respectively pasted to the range of (1, 1) to (LWS, LWY) of the frame buffer coordinates. Note that the position of the coordinate value X=SWX or Y=SWY in the original texture is the range where the corresponding texture coordinate u or v is 1 or more, corresponding to the area of the outside the image. Therefore, as to the image of this part, pasting is not performed, the adjacent texels are pasted, and the processing of preventing a protrusion of a texture image during pasting texture is performed as needed. Meanwhile, the texture image is also protruded with respect to the frame buffer 48 as a pasting destination. However, as to this protrusion of the texture image also, such a protruded portion is not drawn.

Further, at this time, only when the color of the texel of two-layered texture has the same pixel value at the same pasting position, the texel of semi-transparent and the color is overwritten on the enlarged game image 200 at the position of the frame buffer 48, and in other case, overwriting of texture is not performed. Namely, in the step S17, it is only the semi-transparent texel that is actually drawn on the frame buffer 48. As an option of texture pasting, a selection of a pasting pixel by comparison as described above can be given as an instruction to the GPU 42. Therefore, in this embodiment, by performing the above-described processing, high-speed processing can be realized.

Figure 7:
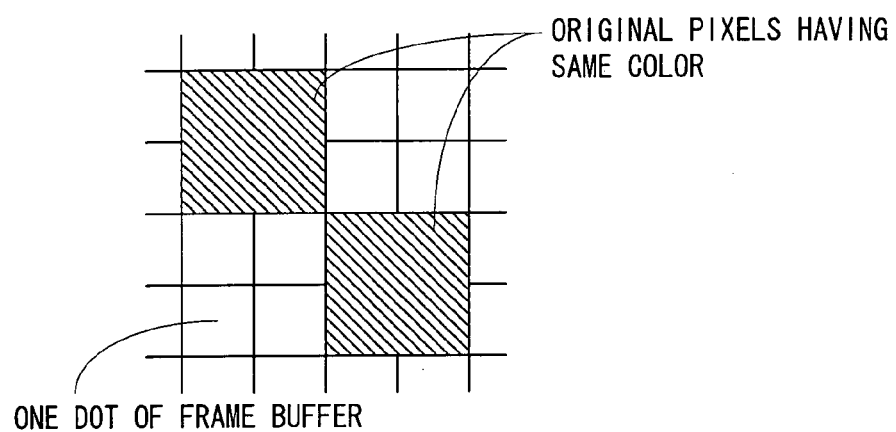
FIG. 7 is an illustrative view for explaining a jaggy interpolation in a lower right direction.
Figure 7:
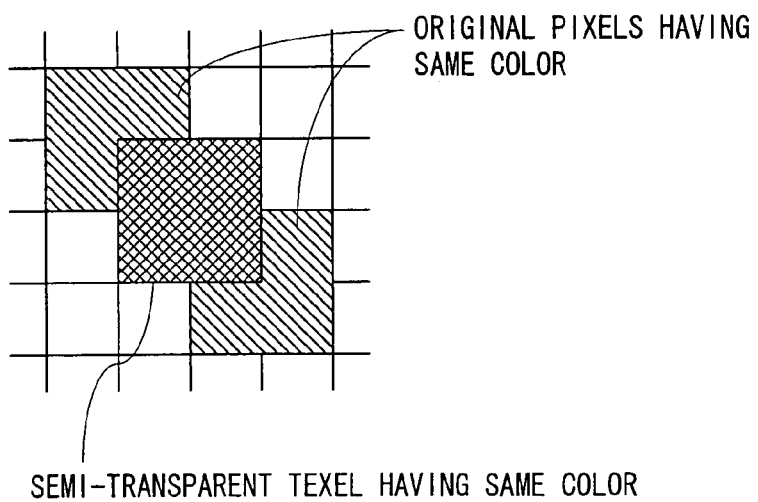

By performing the above-described drawing processing of overwriting the texture, the following image can be obtained when the jaggy interpolation in the lower right direction is applied. In FIG. 7 (A) and FIG. 7 (B), one cell shows one pixel of the frame buffer 48, and one pixel in the original game image 100 is pasted by being enlarged into double in the longitudinal and lateral directions respectively. Therefore, the size of four pixels as shown by oblique line of FIG. 7 is formed, and the area corresponding to the four pixels is called an original pixel. When two original pixels adjacent to each other in the lower right direction have the same color as shown in FIG. 7 (A), the texel of the semi-transparent and in this color is drawn in the intermediate portion thereof. By executing such a processing for each original pixel, the jaggy in the lower right direction can be reduced over an entire part of the game image.

Figure 8:
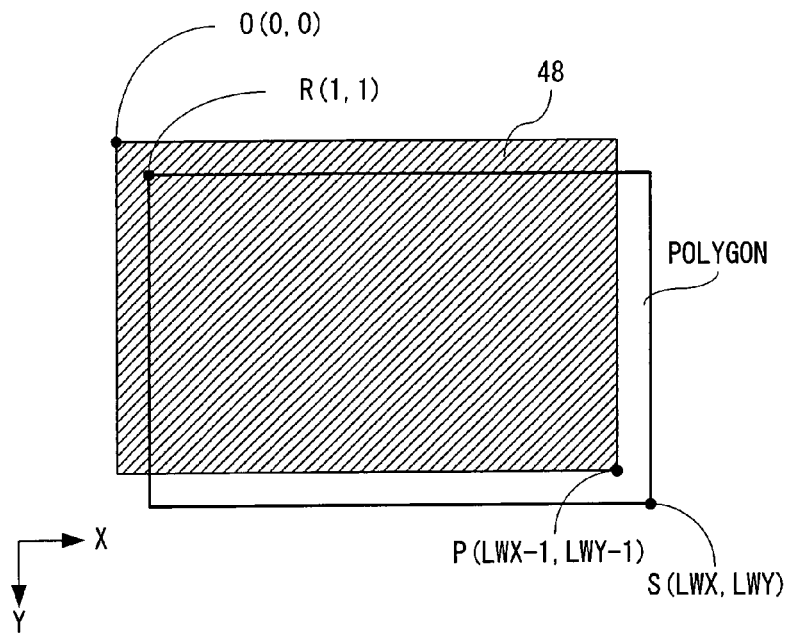
FIG. 8 is an illustrative view showing a polygon for pasting an original texture drawn on a frame buffer when the jaggy interpolation is performed.
Figure 8:
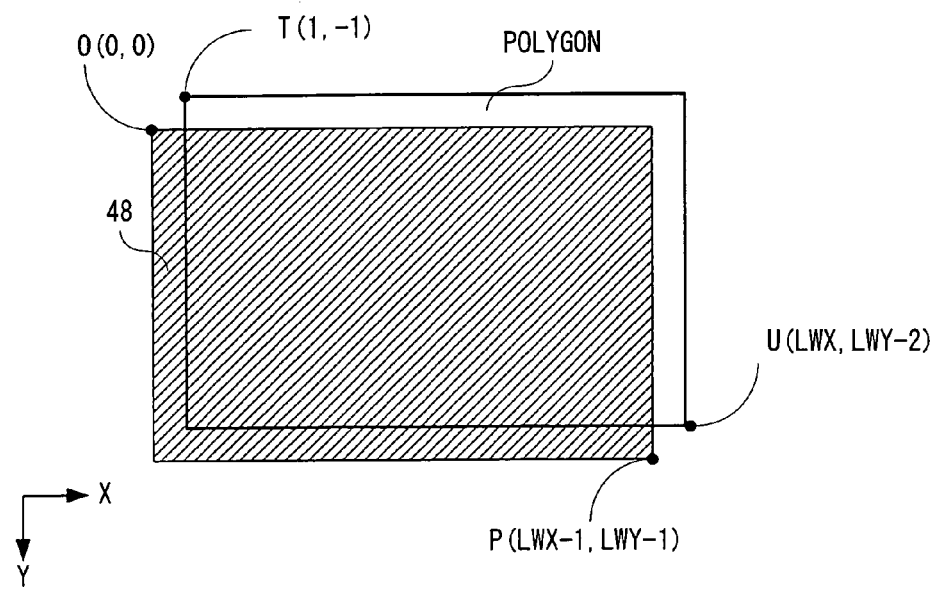

Here, the jaggy interpolation processing in the lower right direction will be specifically explained. As shown in FIG. 8 (A), in a state of being shifted by prescribed numbers of pixels from the original point O of the frame buffer 48 in an obliquely lower right direction (in this embodiment, by one pixel (dot) in the longitudinal direction (lower direction) and in the lateral direction (right direction)), a rectangular polygon having the same size as the frame buffer 48 is drawn. On this polygon, the original texture is superposed and pasted twice so as to be enlarged into double in each case. However, when the original texture is pasted twice, a different part of the same texture designated by different texture coordinates is respectively pasted.

Figure 9:
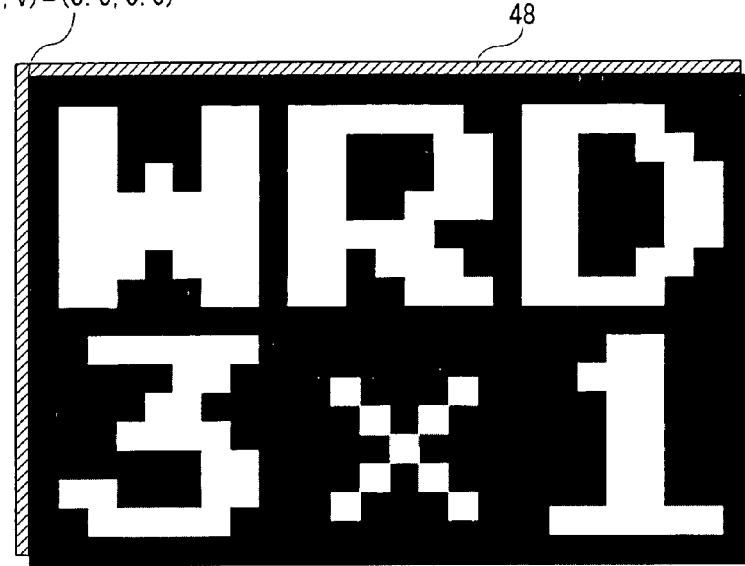
FIG. 9 is an illustrative view showing a situation in that the original texture is pasted to the polygon.
Figure 9:
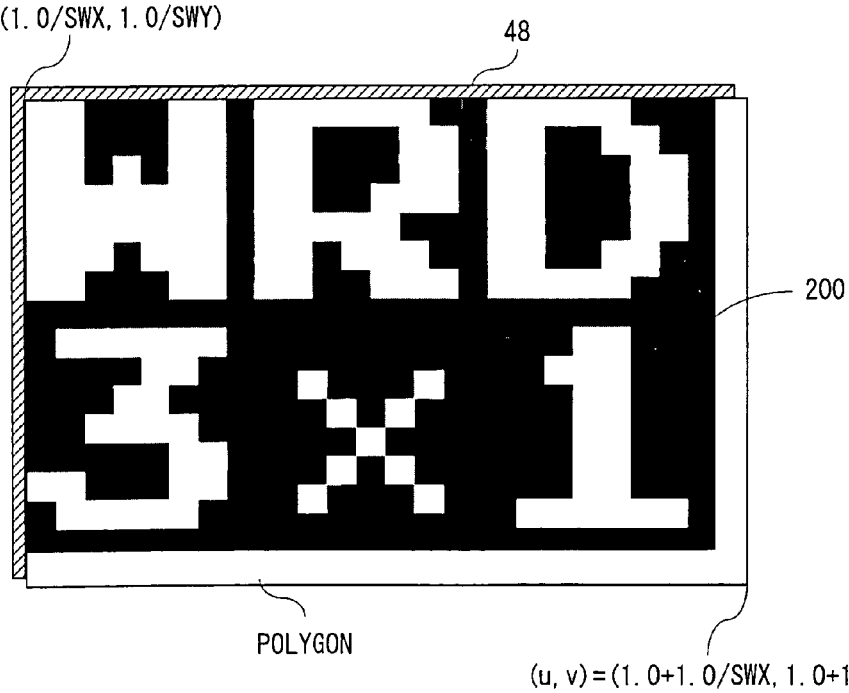

As shown in FIG. 9 (A), in one of the pasting processing, the texture is pasted to the polygon with the texture coordinates of the original texture as it is. Namely, the original texture is pasted to the polygon, so that an upper left apex of the original texture is coincident with an upper left apex of the polygon. Also, as shown in FIG. 9 (B), in the other pasting processing, the original texture is pasted to the polygon by designating the position where the texture coordinates are shifted to the lower right direction by one texel. Namely, the original texture is pasted to the polygon, so that the position shifted by one texel from the upper left side to the lower right side of the original texture is coincident with the upper left apex of the polygon.

Figure 10:
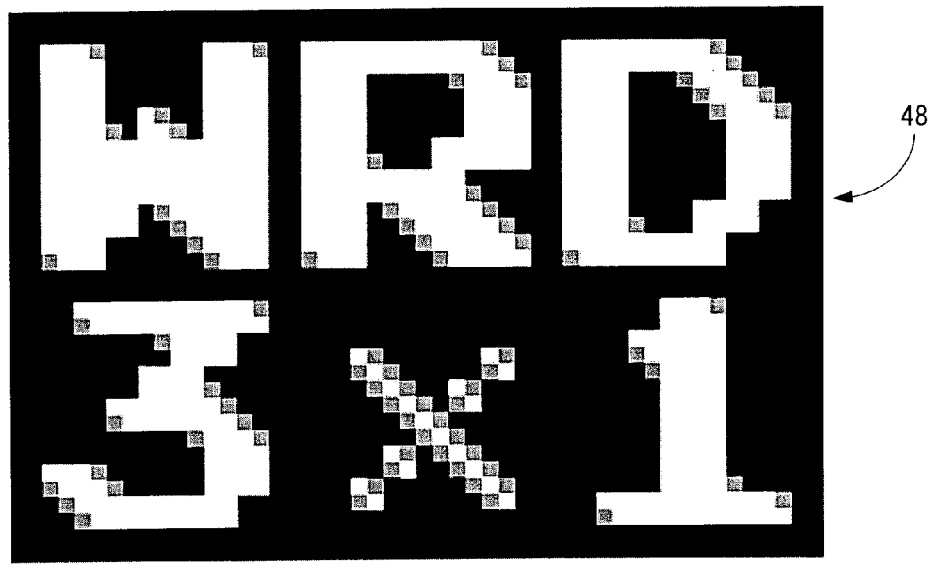
FIG. 10 is an illustrative view showing the enlarged game image after applying a jaggy interpolating processing in the lower right direction and showing an enlarged game image that has undergone further jaggy interpolation processing in an upper right direction.
Figure 10:
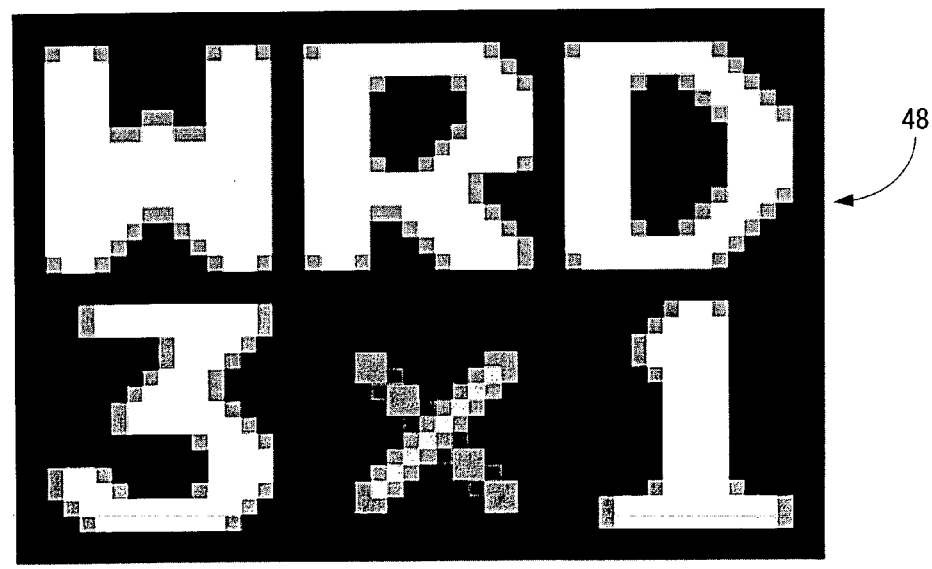

When the two-layered textures are superposed on each other and the texels superposed on each other at the same pasting position have the same color, the texel of semi-transparent and in this color is drawn on the position (dot) of the corresponding frame buffer 48. As described above, the polygon is drawn by shifting it by one dot in the lower right side of the frame buffer 48. Therefore, as shown in FIG. 7 (B), drawing of the texture is performed on the part between original pixels, and the jaggy interpolation processing in the lower right direction is applied. Accordingly, the enlarged game image 200 as shown in FIG. 6 (B) is changed as shown in FIG. 10 (A).

Explanation is returned to FIG. 5, and in a step S19, the jaggy interpolation processing in the upper right direction is performed. The original texture is formed in a two-layered structure of the texture coordinates as they are and the texture coordinates shifted so as to gather the texels of obliquely upper right side, and is enlarged into double and drawn in the range from frame buffer coordinates (1, −1) to (LWX, LWY−2). However, at this time, only the dot, in that the texels of the two-layered texture have the same color, is drawn. The color of the texel to be drawn is made semi-transparent. The jaggy interpolation processing in the upper right side in this step S19 is approximately the same as the jaggy interpolation processing in the lower right direction in the step S17 except for a shifting direction of the image, and therefore a simple explanation will be given.

As shown in FIG. 8 (B), in the jaggy interpolation processing in the upper right direction as described above, the polygon is drawn by shifting it by one dot in the upper right side of the frame buffer 48. The original texture is superposed on this polygon, so as to be pasted twice in a range designated by different texture coordinates. In one of the pasting processing, the original texture is pasted to the polygon by the texture coordinates as they are. In the other pasting processing, the original texture is pasted to the polygon by designating the texture coordinates shifted by one texel in the upper right side. When these two textures are superposed on each other and the superposed texels have the same color, the texel of semi-transparent and in this color is overwritten and drawn on the position (dot) of the corresponding frame buffer 48. Accordingly, the jaggy interpolation processing in the upper right direction is further applied to the enlarged game image 200 that has already undergone the jaggy interpolation processing in the lower right direction as shown in FIG. 10 (A), and as shown in FIG. 10 (B), the enlarged game image 200 is changed, and the jaggy in the oblique direction is reduced.

Returning to FIG. 5, it is determined whether or not color emphasizing is performed in a step S21. When the jaggy interpolation processing is performed, as shown in FIG. 10 (B), a jaggy portion is blurred and a smoothened image is generated. However, since the original game image 100 is composed of only one pixel like the dot picture of a game and in a case of the image including a part where drawing is performed by line having a width of only one pixel, the image is blurred, thereby making it hard to see. Therefore, the color emphasizing processing is performed, for emphasizing only this part as needed. Specifically, the CPU 36 determines whether or not the color emphasizing flag 404*d* is on, that is set in accordance with a need by a user. If "NO" in the step S21, namely, when the color emphasizing is not performed, the processing is returned to the step S3 shown in FIG. 4 as it is. Meanwhile, if "YES" in the step S21, namely, when the color emphasizing is performed, the color emphasizing processing is performed in a step S23.

In the color emphasizing processing in the step S23, using a similar way in the step S17 or the step S19, it is determined whether or not the texels have the same pixel values that are superposed on each other when the texture coordinates are shifted in the upper and lower directions or in the right and left directions. In a case of the same pixel values, the texel of the original texture to be pasted without being shifted to the position, is overwritten in a state of prescribed opaqueness. Specifically, pasting processing is performed five times onto a range of the frame buffer coordinates (0, 0) to (LWX−1, LWY−1), by designating the texture coordinates corresponding to the range of (0, 0) to (SWX−1, SWY−1), the range of (0, 1) to (SWX−1, SWY), the range of (0, −1) to (SWX−1, SWY−2), the range of (1, 0) to (SWX, SWY−1), and the range of (−1, 0) to (SWX−2, SWY−1), respective. Namely, the processing of enlarging the original texture into double and pasting it as it is, and the processing of shifting the original texture to the upper or lower side or to the right or left side and pasting it are performed. At this time, in the original texture shifted to the upper side or to the lower side, the pixel values of the texels at the same pasting position are compared. Similarly, in the original textures shifted to the right side or to the left side, the pixel values of the texels at the same pasting position are compared. The texel at this pasting position of the texture enlarged as it is without being shifted is overwritten in opaqueness in accordance with the result of the comparison. In accordance with the comparison result, the opaqueness for drawing is set as opaqueness a (such as 50%) when any one of the texels in the upper and lower sides or in the right and left sides has the same pixel value. Meanwhile, the opaqueness for drawing is set as opaqueness α+α when the texels in the upper and lower directions and in the right and left directions have the same pixel values. When none of the comparison results shows the same pixel value, the opaqueness is set at 0, and the image of this pasting part is not updated.

Figure 11:
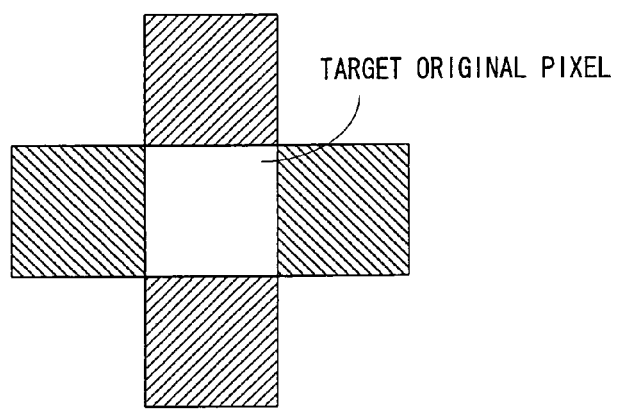
FIG. 11 is an illustrative view for explaining a color emphasizing processing.
Figure 12:
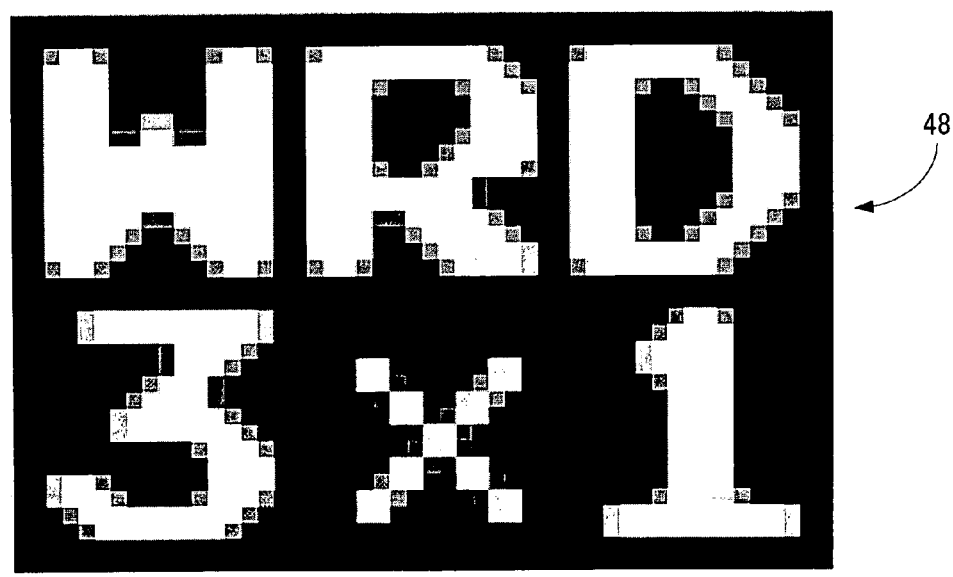
FIG. 12 is an illustrative view showing a change when the color emphasizing processing is applied to the enlarged image that has undergone the jaggy interpolation processing in the upper right direction shown in FIG. 10.

Namely, as shown in FIG. 11, in the original game image 100, the pixel values of target original pixels in the upper and lower and in the right and left sides are respectively compared. When the original pixel has the same pixel value, this target pixel is determined to be a point of one pixel or a line having the width of one pixel, and therefore the texel is drawn on the position corresponding to this original pixel so as to be superposed thereon to emphasize it. Accordingly, by the processing in the step S23, the color of the image satisfying a prescribed condition is emphasized, and is changed as shown in FIG. 12. Then, in the step S5, the enlarged game image 200 that has undergone jaggy interpolation processing and color emphasizing processing is read from the frame buffer 48, and the game screen is displayed on the monitor 34.

Note that strictly speaking, the processing in the steps S9, S13, S15, S17, S19 and S23 shown in FIG. 4 and FIG. 5 is the image processing executed by the GPU 42 according to the instruction of the CPU 36, and the processing is executed at high speed by treating the image displayed as described above as the texture.

Note that in the embodiment, the processing is effectively executed by using the GPU 42 capable of performing 3D-image processing, and therefore needless to say, although 3D-texture pasting processing is used, the processing may be performed by 2D-image processing.

According to this embodiment, not only by performing the jaggy interpolation, but also by performing interpolation, a blurred color is emphasized, thus making it possible to improve the quality of the game image. Namely, even in a case of the game image having small numbers of pixels, the jaggy is effectively reduced.

Note that in this embodiment, explanation is given to the game system in that the video game apparatus and the monitor are separately independently provided. However, this embodiment can also be applied to the game apparatus in that the monitor is integrally provided.

Figure 13:
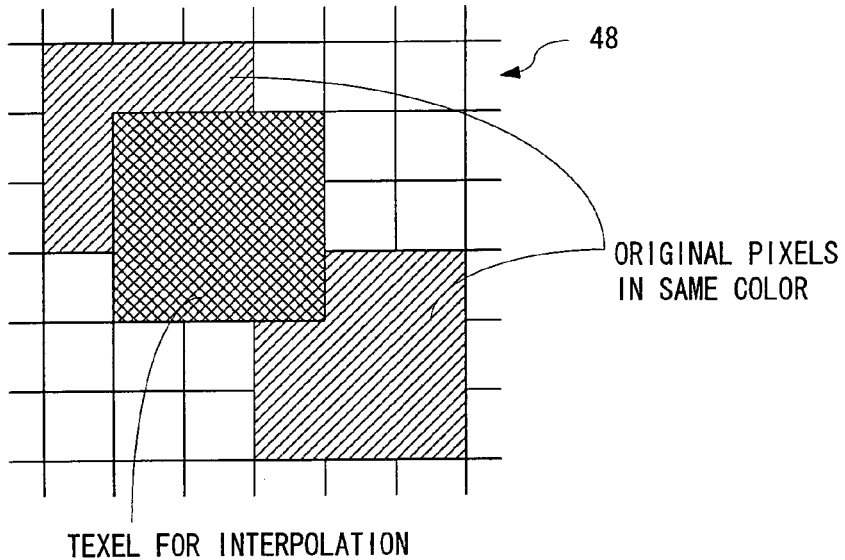
FIG. 13 is an illustrative view for explaining the jaggy interpolation processing in the lower right direction when the resolution of the game image is converted into triple resolution.
Figure 13:
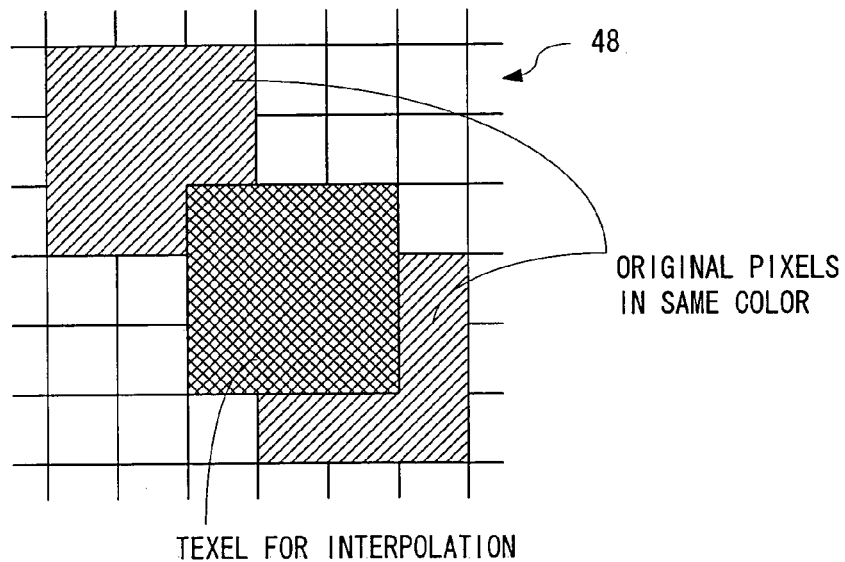
Figure 14:
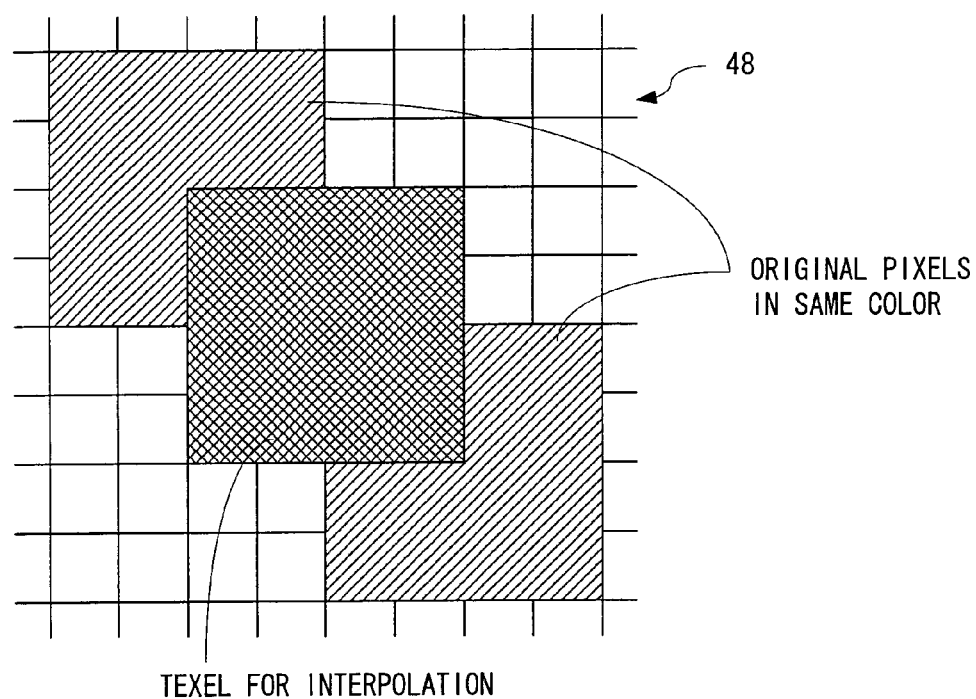
FIG. 14 is an illustrative view for explaining the jaggy interpolation processing in the lower right direction when the resolution of the game image is converted into four-times resolution.

In addition, in this embodiment, in order to convert the resolution into double, the polygon is shifted with respect to the frame buffer 48 by one dot in the lower right direction, in the jaggy interpolation processing in the lower right direction. This is because as shown in FIG. 7, the texel of the jaggy interpolation is drawn on the position shifted by one dot in an obliquely lower right direction. Accordingly, for example, when the resolution is converted into triple, the texel that undergoes the interpolation is shifted by one dot in the lower right direction as shown in FIG. 13 (A) or by two dots in the lower right direction as shown in FIG. 13 (B), and then the texel after shifting is drawn. This contributes to obtaining an advantage of reducing the jaggy. Also, when the resolution is converted into four-times resolution, the texel that undergoes the interpolation is shifted by two dots to the lower right direction and then the texel after shifting is drawn. Thus, the texel can be drawn in the intermediate portion of two texels adjacent to each other in the lower right direction. However, although not shown, even if the texel that undergoes interpolation is shifted by one dot or three dots in the lower right direction and the texel after shifting is drawn, a certain degree of interpolation can be performed between the two texels. The same thing can be said for the jaggy interpolation in the upper right direction. Namely, when the resolution of the image is converted into n-times (integer of two or more), the pixel that undergoes the interpolation may be shifted by m ($1 \leq m \leq n-1$) pixels (dots) to draw the pixel after shifting.

Although the certain exemplary embodiments have been described and illustrated in detail, it is clearly understood that the same is by way of illustration and example only and is not to be taken by way of limitation, the spirit and scope of these certain exemplary embodiments being limited only by the terms of the appended claims.

What is claimed is:

1. A storage medium storing a game image processing program executed by a computer of a game image processing apparatus that converts a resolution of a game image from a first resolution into a second resolution of n-times of the first resolution and outputs the game image after conversion, wherein said game image processing program causes said computer to perform:

generating a high resolution image obtained by converting a low resolution image of the first resolution into said second resolution, and storing the image after conversion in a storage;

comparing pixel values of an arbitrary pixel and the pixel adjacent to the arbitrary pixel in an oblique direction, for the arbitrary pixel in said low resolution image;

shifting the pixel having the same pixel value obtained by comparing pixel values of an arbitrary pixel and the pixel adjacent to the arbitrary pixel, by m ($1 \leq m \leq n-1$) pixels along said oblique direction of the pixel of said high resolution image corresponding to the pixel at said second resolution, then superposing the pixel on the high resolution image in a semi-transparent state, thereby updating said high resolution image; and outputting the high resolution image thus updated by the pixel shifting.

2. A storage medium storing the game image processing program according to claim 1, wherein said comparing includes a first pixel value comparison for comparing pixel values of said arbitrary pixel and the pixel adjacent to said arbitrary pixel in a lower right side; and a second pixel value comparison for comparing the pixel values of said arbitrary pixel and the pixel adjacent to said arbitrary pixel in an upper right side, and the pixel shifting includes shifting the pixel having the same pixel value obtained by the first pixel value comparison by said m-pixels in the lower right direction of the pixel of said high resolution image corresponding to the pixel at the second resolution, then superposing the pixel on the high resolution image in a semi-transparent state, thereby updating said high resolution image; and a second pixel interpolation for shifting the pixel having the same pixel value obtained by the comparison by said second pixel value comparison, by said m-pixels in the upper right direction of the pixel of said high resolution corresponding to the pixel at the second resolution, then superposing the pixel on the high resolution image in a semi-transparent state, thereby updating said high resolution image.

3. A storage medium storing the game image processing program according to claim 1, wherein said game image processing program causes said computer to perform:

a third pixel value comparison for comparing the pixel values of the pixels adjacent to each other in an upper side and a lower side, and the pixels adjacent to each other in a right side and a left side, respectively; and a third pixel value interpolation for superposing the pixel having the same pixel value in at least one of the upper and lower direction and the right and left direction, obtained by the third pixel value comparison, on said high resolution image corresponding to the pixel at said second resolution, in a semi-transparent state, thereby updating said high resolution image.

4. A game image processing apparatus that converts a resolution of a game image from a first resolution into a second resolution of n-times of the first resolution, comprising:

a converter for converting a low resolution image of the first resolution into a high resolution image of said second resolution;

a storage for storing said high resolution image;

a comparing programmed logic circuitry for comparing pixel values of an arbitrary pixel in said low resolution image and the pixel adjacent to said pixel in an oblique direction;

an interpolation programmed logic circuitry for shifting the pixel having the same pixel value obtained by a comparison by said comparing programmed logic circuitry, by m ($1 \leq m \leq n-1$) pixels along said oblique direction of the pixel of said high resolution corresponding to the pixel at said second resolution, then superposing the pixel after conversion on the pixel of said second resolution in a semi-transparent state, thereby updating the high resolution image stored in said high resolution image storage; and an output for outputting the high resolution image after being updated by said interpolation programmed logic circuitry.

5. A game image processing method of a game image processing apparatus that converts a resolution of a game image from a first resolution into a second resolution of n-times of the first resolution, comprising:

(a) generating a high resolution image obtained by converting a low resolution image of a first resolution into the high resolution image of said second resolution;
(b) comparing an arbitrary pixel and the pixel adjacent to said arbitrary pixel in an oblique direction, for the arbitrary pixel in said low resolution image;
(c) shifting the pixel having the same pixel value obtained by a comparison in (b), by m ($1 \leqq m \leqq n-1$) pixels along said oblique direction of the pixel of said high resolution image corresponding to the pixel at said second resolution, then superposing the pixel on the high resolution image in a semi-transparent state, thereby updating said high resolution image; and
(d) outputting the high resolution image updated by (c).

* * * * *